Nov. 7, 1933.  G. B. KARELITZ  1,934,355

OIL BEARING

Filed July 14, 1928

INVENTOR
George B. Karelitz
BY
Wesley G. Carr
ATTORNEY

Patented Nov. 7, 1933

1,934,355

UNITED STATES PATENT OFFICE 1,934,355

OIL BEARING

George B. Karelitz, Wilkinsburg, Pa., assignor to Westinghouse Electric & Manufacturing Company, a corporation of Pennsylvania Application July 14, 1928. Serial No. 292,894

7 Claims. (Cl. 308—132)

My invention relates to bearings and more particularly to armature bearings for dynamo-electric machines having considerable axial end-thrust; as for example, for railway motors utilizing helical-thrust gears or for other machines employed in heavy-service operations.

It was observed that a great number of armature failures were occurring in railway motors which were equipped with helical gears, and, in most instances, the specific cause was traced to the rubbing or heating of the thrust collar.

In the Moore Patent No. 1,417,937, granted on May 30, 1922, is shown a general layout of a railway motor having bearing sleeves of the thrust-collar type to which my invention is applicable. The thrust from the helical gear teeth may be received by the collar on either end of the motor, depending on the direction of rotation. In spite of the fact that every precaution has been taken to lessen the end-thrust and to allow, at the same time, the use of a noiseless, helical gear, some difficulties have been encountered, the reason for which, may be attributed, probably, to the severe conditions under which such equipments are required to operate at the present time.

It has also been observed that failures occur more frequently in the bearing nearest to the pinion, where, in addition to the weight of the armature and thrust load, the bearing must carry the heavy load on the tooth. In view of these conditions, the pinion-end bearing is usually made larger and more rugged than the commutator-end bearing. The commutator-end bearings fail so seldom, that, in their case, any failure may be ascribed to poor maintenance or unavoidable defects.

The thrust load on the collar may be estimated as 14% of the tooth load for a gear having a tooth angle of 7½ degrees. Consequently, where lubrication of the collar is very poor, the coefficient of friction becomes very high, and overheating of the collar end of the bearing sleeve occurs. This heat received by the collar is in addition to that created on the longitudinal surface of the shell itself. Unless some attempt is made to decrease the coefficient of friction on the thrust collars, bearing failures may still be numerous.

It is the object of my invention to produce an armature bearing wherein the thrust collar is more effectively lubricated than has been the case in bearings utilized heretofore.

In practicing my invention, I provide a passageway in the bearing shell through which oil may be communicated from a zone of high hydrostatic pressure on the bearing surface to the thrust-collar surface, to thereby lubricate the same.

My invention will be better understood by referring to the accompanying drawing, in which.

Figure 1:
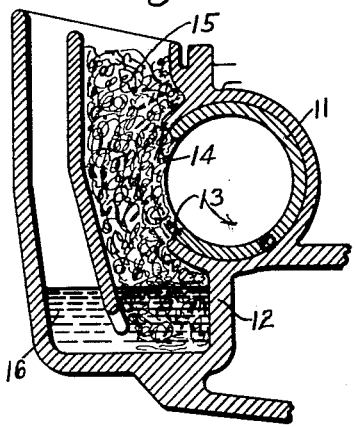
Figure 1 is a cross-sectional view of a waste-packed armature bearing, such as that used on railway motors.

The majority of the railway motors used today employ bearings of the waste-packed type, such as that shown in Fig. 1, in which the lubricant is supplied to the journal by capillary action of the waste. The bearing shell or sleeve 11 is supported in a housing 12 and has a window 13 that is in alignment with the window 14 of the housing 12 through which oil is received from the waste disposed in the waste chamber 15, receiving oil by capillary action from the oil chamber 16 in the bottom of the housing.

The bearing surface of the waste-packed bearing receives a much smaller flow of oil than in a bearing of the oil-ring or forced-feed type, and that portion of the surface on the load line is almost in metal-to-metal contact. The hydrostatic pressure at the ends of the bearings is that of the atmosphere, but it is found that the pressure at points in the middle region is very high. The maximum pressure is reached at a point approximately 20° behind the load line or line of metal-to-metal contact.

This pressure is caused by the motion of the oil in the clearance between the bearing shell and the journal. The oil adheres tightly to the metal surface of both journal and shell and, consequently, high shearing forces are set up in the oil because of its viscosity and the slipping of layers over each other. This results in considerable hydrostatic pressure between the rubbing surfaces. The intensity of the hydrostatic pressure increases with the viscosity of the oil, with the relative velocity and with the decrease of clearance between the planes. The windows in bearing are located external of this zone of pressure.

Since the majority of troubles due to thrust have been found in railway applications, particularly in those utilizing helical gears, it is my intention to illustrate the conditions found in such applications, in preference to those found in other applications, but it will be understood that my invention has equal application to bearings of other types and to those used on motors other than those embodied in railway equipments.

Figure 2:
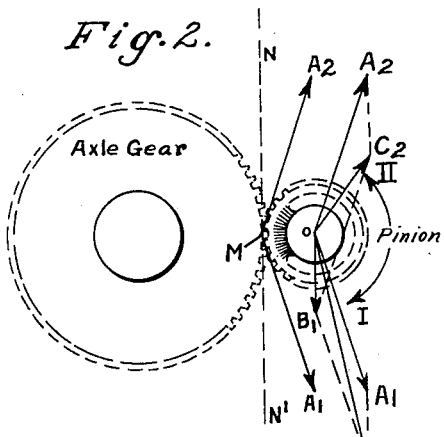
Fig. 2 is a loading diagram for a pinion-end bearing of a railway motor.

In Fig. 2, is shown a loading diagram for a pinion-end bearing when the motor is acting as a driving motor. The tooth load acts at an angle to the tangent NN' of the pitch circles of the gears, at M. Assuming that the pinion gear is driving in a clockwise direction, indicated by the arrow I, the load acting on the tooth may be represented as $A_1$, and this load acting on the bearing may be represented by $OA_1$, while the acting load caused by the weight of the armature may be represented by $OB_1$, and the resultant of these forces, $OC_1$, acting substantially downwardly. When the helical gear is driving in a counter-clockwise direction, as indicated by the arrow II, the tooth load is partly compensated for by the armature load, and the resultant acts in the direction $OC_2$.

It will be noted that both of the resultants $OC_1$ and $OC_2$ act at about the same angular distances from the vertical axis of the bearing. In such case, the zones of hydrostatic pressure for the two directions of rotation are found to overlap into the same circumferential regions, as shown in Fig. 3, and, consequently, a passageway 21 of my invention, disposed in a circumferential location approximately midway between the two resultants, will serve to lubricate a thrust-collar portion 22 for both directions of rotation.

The maximum hydrostatic pressures, at approximately 20° behind the resultant, are found to be, at times, very high, and it does not appear to be necessary to tap at these points when pressure more removed from the resultant point is sufficient to positively feed oil to the thrust-collar surface.

Figure 3:
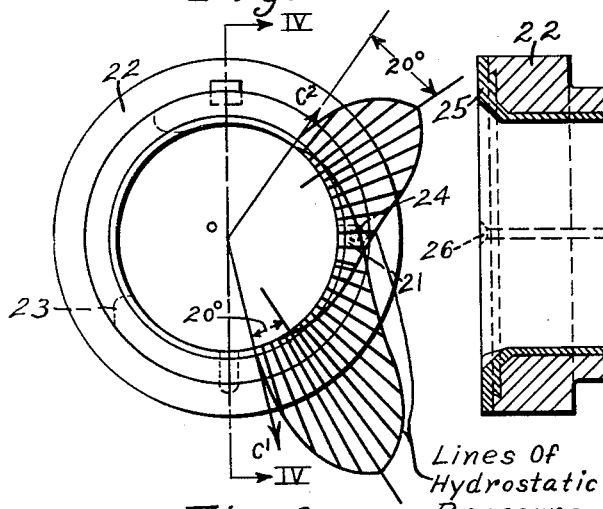
Fig. 3 is an end view of a pinion-end bearing sleeve of a railway motor, showing the distribution of oil pressure over the surface thereof and embodying my invention.
Figure 4:
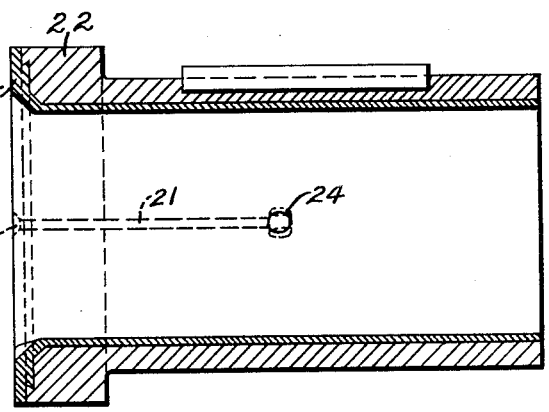
Fig. 4 is a longitudinal cross-section taken on the line IV—IV of Fig. 3.

In Fig. 3 is illustrated a pinion-end bearing which is somewhat larger than the commutator-end bearing in that it carries most of the tooth load. It has a window 23 which is disposed in alignment with the window of the housing, as illustrated above, and has the passageway 21 of my invention located at a point at which there is sufficient pressure for rotation in either direction of the shaft. A small hole 24, of about ¼ inch in diameter, is drilled in the shell of the bearing at the entrance of the passageway 21 extending outwardly to the thrust-collar surface.

In order to prevent wearing of the babbitt material 25 on the thrust collar surface, the mouth 26 of the passageway is counter-sunk.

Figure 6:
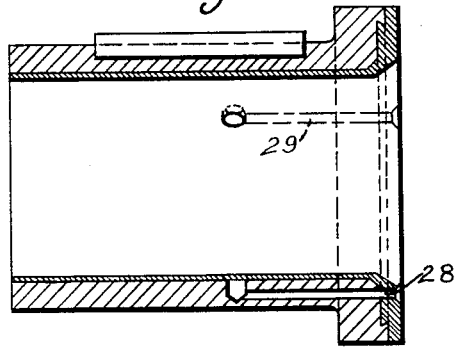
Fig. 6 is a longitudinal cross-section taken on the line VI—VI of Fig. 5.
Figure 5:
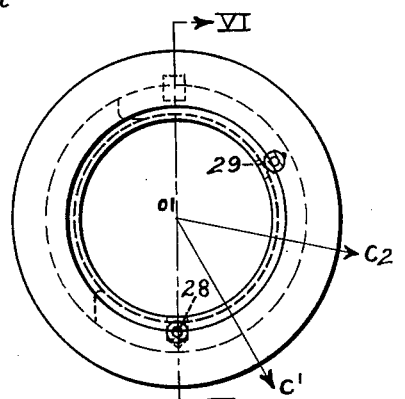
Fig. 5 is an end-view of a commutator-end bearing sleeve for a railway motor embodying my invention, looking from the pinion end of the motor.

In Figs. 5 and 6, is shown the resultant forces acting on the commutator-end bearing of a railway motor for both directions of rotation. Since the zones of hydrostatic pressure do not overlap each other, it is necessary that two passageways be drilled in the shell, as is shown at 28 and 29.

Although I have described my bearing in connection with a railway motor, it will be understood that it may be applied to other motors wherein appreciable axial thrust causes excess heating of bearings.

Further, I do not wish to be limited to the exact positions of the holes, as shown in the drawing, for they may vary considerably in accordance with the type of bearing and conditions of loading thereon. Consequently, I have produced a means for reducing the bearing troubles caused by axial thrust and it is expected that only such limitations shall be imposed as are defined by the appended claims.

I claim as my invention:

1. A waste-packed, oil-lubricated armature bearing, comprising a housing, a bearing shell having a thrust-collar portion and a journal-bearing portion and having a window in the face of the latter, and waste-packed means for conveying lubricating oil to said journal-bearing portion through said window, characterized by having means for lubricating the end-surface of the thrust collar comprising an unobstructed passageway through which oil may be drawn only from the middle region of said shell surface and communicated to the thrust-collar surface, said passageway terminating, at one end, at the thrust-collar bearing surface and, at the other end, in a smooth, grooveless portion of said shell surface.

2. A waste-packed, oil-lubricated bearing for an armature axle shaft of a geared motor having axial thrust thereon, comprising a bearing sleeve having a thrust-collar portion adapted to wear against a flange portion on said shaft, characterized by the fact that said sleeve has an unobstructed passageway which conducts oil only from a zone of high hydrostatic pressure within said bearing at an ungrooved portion thereof to the wearing surfaces of said flange and said thrust collar.

3. In combination with a shaft and an oil-bearing sleeve having a thrust-collar portion, means for lubricating the journal surfaces between said shaft and said sleeve, the pressure of oil within an ungrooved surface of said sleeve when said shaft is rotating in a given direction being highest at approximately 20 degrees behind the load line, and means for tapping only said zone of high pressure whereby oil may be positively fed to the surface of the thrust-collar portion.

4. In combination with a shaft and an oil-bearing sleeve having a thrust collar portion, means for lubricating the journal surfaces between said shaft and said sleeve, the pressure of oil within said sleeve, when said shaft is rotating in either direction, being built up in an ungrooved zone behind the load line, and said sleeve having a single passageway communicating only with said zone in the journal surfaces for conducting oil to the thrust-collar surface from said zone, and disposed between the two load lines, one of which lines being established when shaft is rotating in one direction and the other being established when rotating in the reverse direction.

5. A rotating shaft for translating mechanical power provided with a bearing having journal and thrust-bearing surfaces and with capillary oil-supplying means for lubricating the journal surface, characterized by a hole in a smooth, ungrooved journal surface at a point which is removed from the ends of the bearing and from said capillary oil-supplying means and at which a material oil-pressure exists, and passageway means communicating with said hole and constituting means for positively feeding oil from said oil-pressure point of the thrust-bearing surface.

6. A rotating shaft for translating mechanical power provided with a bearing having journal and thrust-bearing surfaces and with capillary oil-supplying means for lubricating the journal surface, characterized by the fact that said bearing has substantially non-overlapping oil-pressure zones for different directions of rotation, and characterized further by a plurality of holes in a smooth, ungrooved journal surface at points removed from the ends of the bearing and from said capillary oil-supplying means and including at least one hole in a substantial oil-pressure area for each direction of rotation, and passageway means communicating with said holes and constituting means for positively feeding oil from said oil-pressure areas to the thrust-bearing surface.

7. In combination with a shaft and an oil-bearing sleeve having a thrust-collar portion, means for lubricating the journal surfaces between said shaft and said sleeve, the pressure of oil within said sleeve, when said shaft is rotating in either direction, being built up in an ungrooved zone behind the load line, and said sleeve having a plurality of holes for conducting to the thrust-collar surfaces only from said zone in the journal surfaces in order to sustain an oil flow upon shifting of the load line.

GEORGE B. KARELITZ.